2 Sheets--Sheet 1.

J. G. MOORE.

Machines for Grinding Wood for Paper Pulp.

No. 5,936. Reissued June 30, 1874.

WITNESSES

Harry King

B. F. Morse

By James G. Moore INVENTOR

Wm D. Baldwin, Jr.

Attorney

2 Sheets--Sheet 2.

J. G. MOORE.

Machines for Grinding Wood for Paper Pulp.

No. 5,936. Reissued June 30, 1874.

WITNESSES

Harry King

B. L. Morse

By

INVENTOR

James G. Moore

Wm. D. Baldwin, his

Attorney

UNITED STATES PATENT OFFICE.

JAMES G. MOORE, OF LISBON, NEW HAMPSHIRE.

IMPROVEMENT IN MACHINES FOR GRINDING WOOD FOR PAPER-PULP.

Specification forming part of Letters Patent No. 133,243, dated November 19, 1872; reissue No. 5,936, dated June 30, 1874; application filed February 10, 1874.

*To all whom it may concern:*

Be it known that I, JAMES G. MOORE, of Lisbon, in the county of Grafton and State of New Hampshire, have invented a new and useful Improvement in the Art of Reducing Wood to Pulp by Grinding, and also a new machine by means of which such improvement may be effected, and also analogous operations upon other materials may be performed; and that the following, taken in connection with the drawings, is a full, clear, and exact description thereof.

Figure 1:
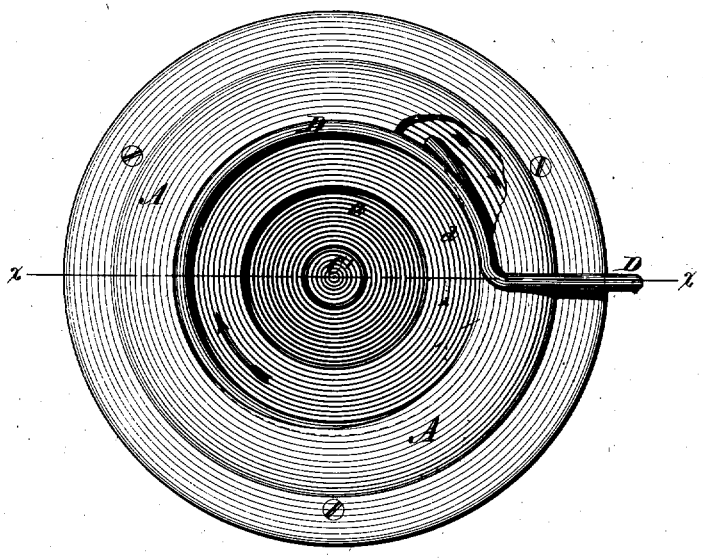
Figure 2:
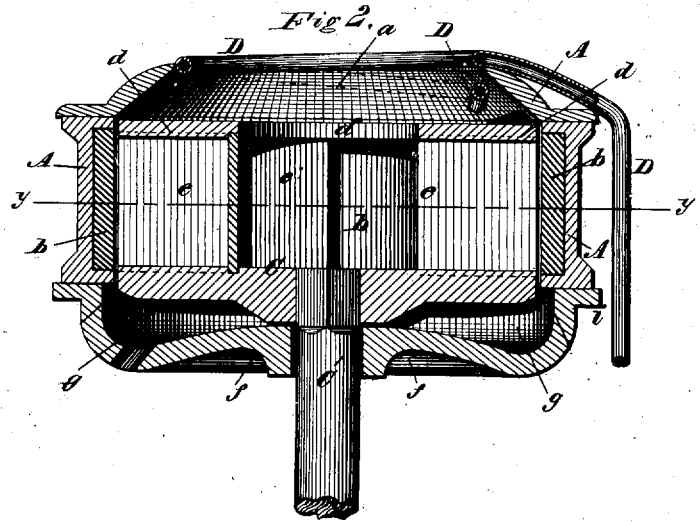
Figure 3:
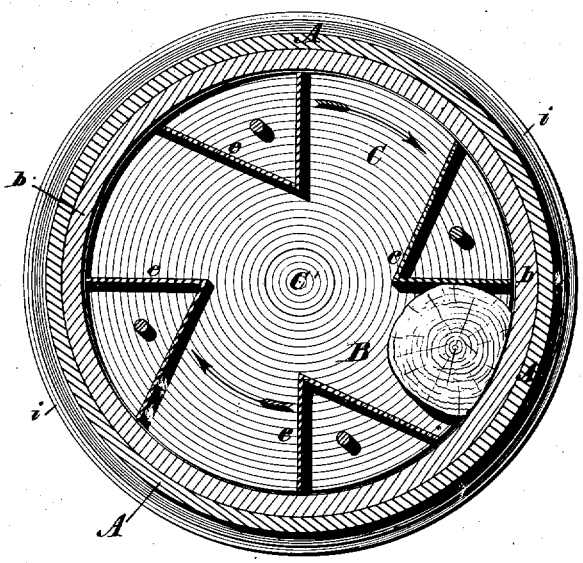
Figure 4:
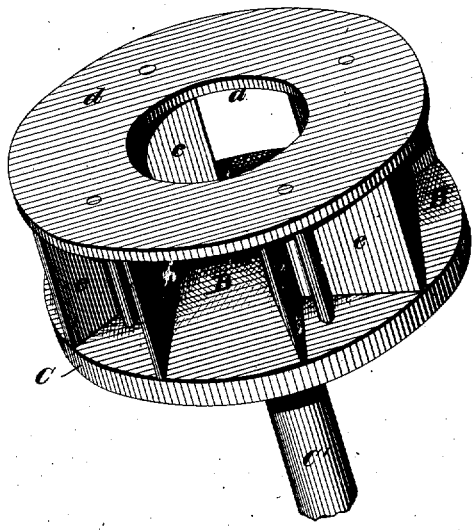

In the drawings, Figure 1 is a plan or top view of my machine. Fig. 2 is a vertical central section through the same on the line *x x* of Fig. 1. Fig. 3 is a horizontal section through the same, at about the middle thereof, on the line *y y* of Fig. 2; and Fig. 4, a perspective view of the rotary carrier.

Prior to the date of my invention wood had been reduced to pulp by making pressure between the wood and the grinding-surface by means of weights or springs, or by proper machinery, such as feeding-screws.

By my invention, among other advantages to be specified hereafter, the wood is moved past a stationary grinding-surface, and is forced toward it by means of centrifugal force, thereby dispensing with weights, springs, or feeding mechanism, and causing the wood to be pressed upon the grinding-surface by the same power and machinery which causes the wood to progress over the grinding-surface. I am thus enabled to regulate the pressure of the wood upon the grinding-surface by the velocity of revolution of the wood, other things being equal.

The machine shown in the drawings has a cylindrical ring, *b*, which may be made of abrasive material, or have its inner surface lined or covered with an abrasive material, such as cement or composition of which emery or other grinding material is a component part. This ring is supported in a case, A, having an opening, *a*, in its top. A rotary carrier, B, is arranged within the said ring, and its axis is the same as that of the ring. This carrier is composed of a circular disk, C, an annulus, *d*, and a series of buckets, *e*, the whole being mounted upon a shaft, C′, to which rapid rotary motion may be imparted by means of a suitable prime mover. The disk C supports the wood to be ground, and when in revolution causes the wood to be thrown out centrifugally, as bodies are thrown outward when placed upon a whirling table. The buckets *e* likewise cause the wood to rotate, and therefore to be thrown outward or centrifugally, and also traverse the wood over the grinding-surface positively as fast as the buckets move. The case has a cover with a hole in the center, through which wood is entered, so as to be seized by the feeder or carrier, and is also provided with a tube or pipe, D, through which water may be supplied. Below the case is a trough-shaped receptacle, *f g*, provided with an escape-opening, *h*, and care must be taken to leave a small space between the disk C and the grinding-surface, so that the pulp may escape when ground.

It will be observed that in this machine the water for washing off the fibers, as produced, is thrown for this purpose across the grinding-surface by centrifugal force. It is important to have the fibers removed as soon as possible after they are produced, so that they may not be ground over again, and so that the grinding-surface may be kept clear. This operation is not, I believe, performed as perfectly by any previously-known mode of applying the water as it is by applying it under centrifugal force, as above stated.

In the operation of the machine, the shaft is to be revolved and billets of wood are to be placed on the carrier. The wood, as soon as it touches the revolving disk or enters between any two buckets, is immediately thrown outward and against the grinding-surface, and will be carried over this surface by the buckets and pressed upon the surface by centrifugal force as long as the machine is in operation. In this way it is rapidly reduced to pulp, water being introduced, as before described. The pulp, as ground, escapes between the revolving feeder or carrier and the cylindrical grinding-surface.

I claim—

1. These two elements of a machine in combination, viz: First, a grinding-ring or hollow cylinder provided with a grinding-surface; second, a carrier capable of rotating rapidly within said ring, and with its periphery in close proximity thereto, both constructed and operating substantially as specified, whereby billets of wood may be carried round by said carrier, kept in contact with said surface by means of centrifugal force, and ground to fiber by being traversed over the grinding-surface or grinding-ring.

2. As a means of imparting to the wood to be ground a more positive revolution, and consequently of foreing it more certainly and forcibly against the grinding surface or ring, in combination with the carrier and the grinding ring or cylinder provided with a grinding-surface, buckets attached to the carrier, between which buckets the billets of wood are placed, all these parts being constructed and operating, severally and in combination, substantially as herein described.

3. In combination, a grinding-ring or hollow cylinder provided with a grinding-surface, a rotating carrier, and a pipe for the introduction of water, all constructed and operating substantially as described, and arranged with reference to each other substantially as specified, whereby not only is the wood ground, but the water is thrown by centrifugal force against the face of the grinding-ring to wash the same free from pulp.

JAMES G. MOORE.

Witnesses:
N. AUSTIN PARKS,
J. HENRY TAYLOR.